United States Patent [19]
Qvintus et al.

[11] Patent Number: 6,086,713
[45] Date of Patent: Jul. 11, 2000

[54] METHOD OF TREATING PULP

[75] Inventors: Harri Qvintus, Glens Falls, N.Y.; Pekka Tervola, Helsinki, Finland

[73] Assignee: Ahlstrom Machinery Oy, Espoo, Finland

[21] Appl. No.: 09/014,285

[22] Filed: Jan. 27, 1998

Related U.S. Application Data

[60] Provisional application No. 60/037,257, Jan. 31, 1997.

[51] Int. Cl.[7] .................................................. D21C 9/02
[52] U.S. Cl. .................................................. 162/60; 68/27
[58] Field of Search .................. 162/60; 68/27; 210/772, 779

[56] References Cited

U.S. PATENT DOCUMENTS

| | | |
|---|---|---|
| 3,454,970 | 7/1969 | Sutherland . |
| 4,705,600 | 11/1987 | Jacobsen . |
| 4,780,181 | 10/1988 | Lind ........................................... 162/17 |
| 4,919,158 | 4/1990 | Kokkonen et al. . |
| 5,116,423 | 5/1992 | Kokkonen et al. . |
| 5,567,279 | 10/1996 | Phillips et al. ............................ 162/232 |

FOREIGN PATENT DOCUMENTS

| PCT/FI96/ 00316 | 3/1997 | Finland . |
|---|---|---|

*Primary Examiner*—Peter Chin
*Attorney, Agent, or Firm*—Nixon & Vanderhye P.C.

[57] ABSTRACT

A method is provided by which it possible to intensify a cellulose pulp wash without requiring the purchase of additional equipment. In a washing system having a plurality of stages with a filtrate from each stage, the stages in sequence being N, N+1, etc., and each stage including filtrates $F_N$ and $F_{N+1}$, etc., part of the filtrate $F_N$ (e.g. about 5–30 %) is combined with all or part of the filtrate for $F_{N+1}$ to produce a combined filtrate, and the combined filtrate is fed in washing stage N as wash liquid. The part of the filtrate $F_N$ that is taken for use as wash liquid in stage N is typically from the end of the washing stage N. The process may be repeated for most of the stages of the washing system.

20 Claims, 6 Drawing Sheets

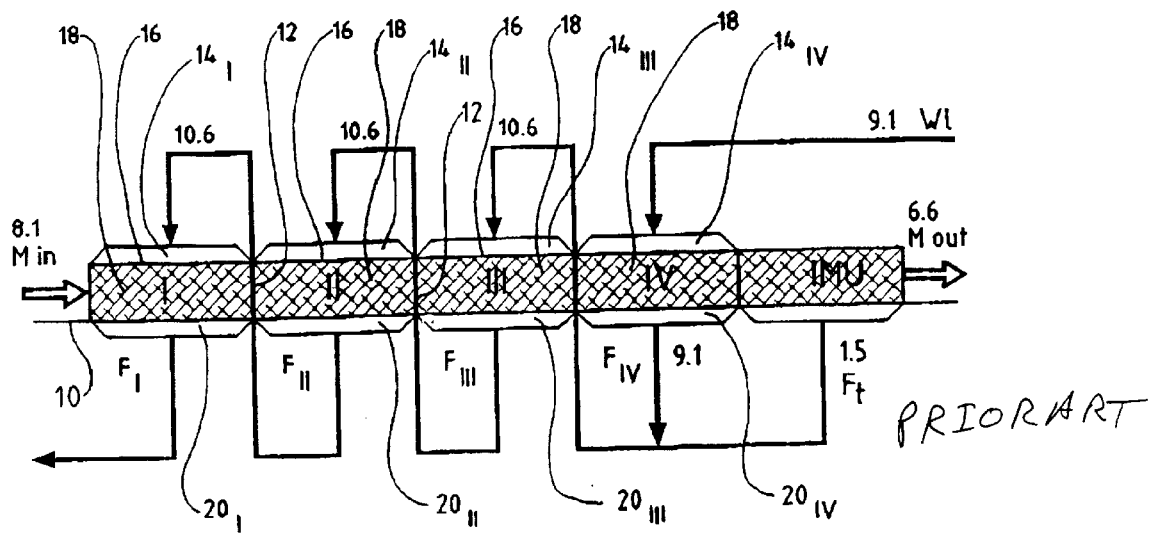
Fig. 1        DF = 2.5
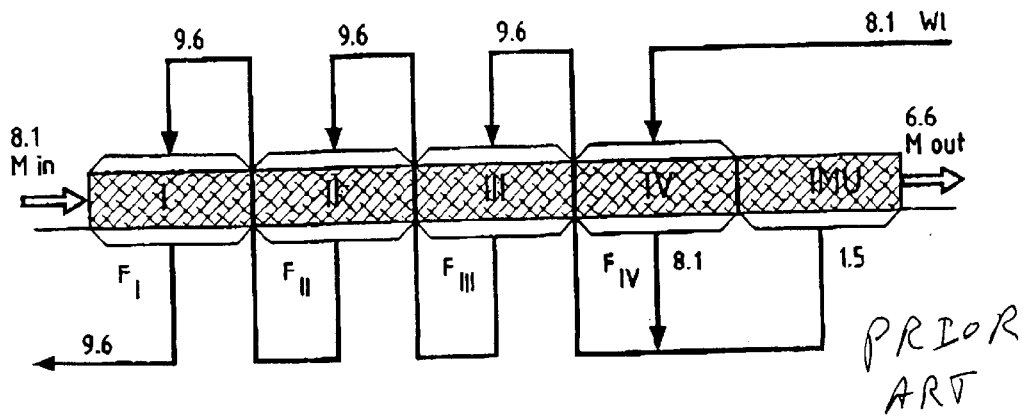
Fig. 2        DF = 1.5

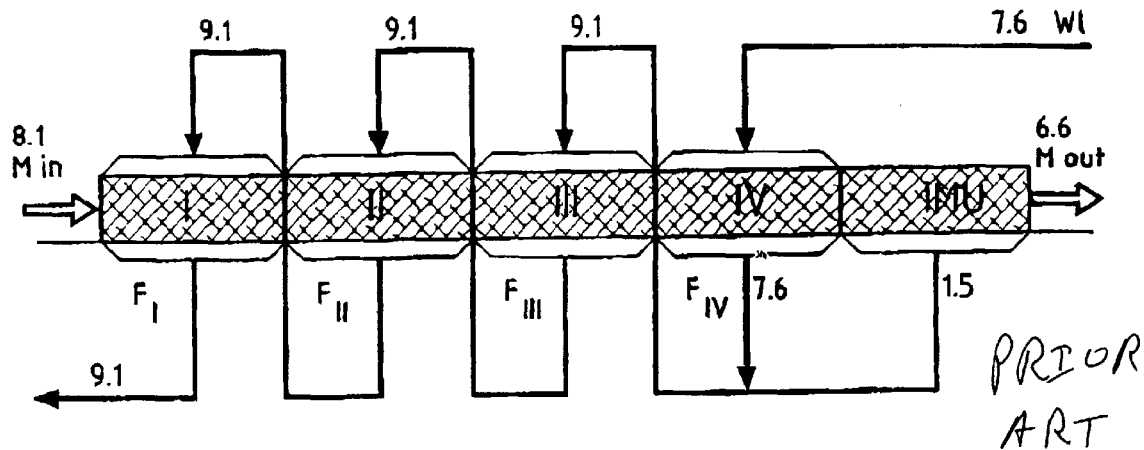
Fig. 3    DF = 1.0    PRIOR ART
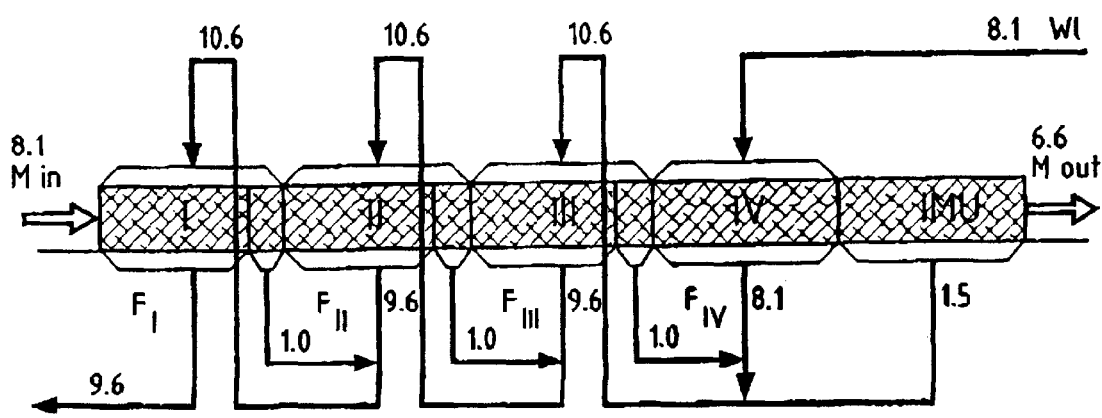
Fig. 4    DF = 1.5

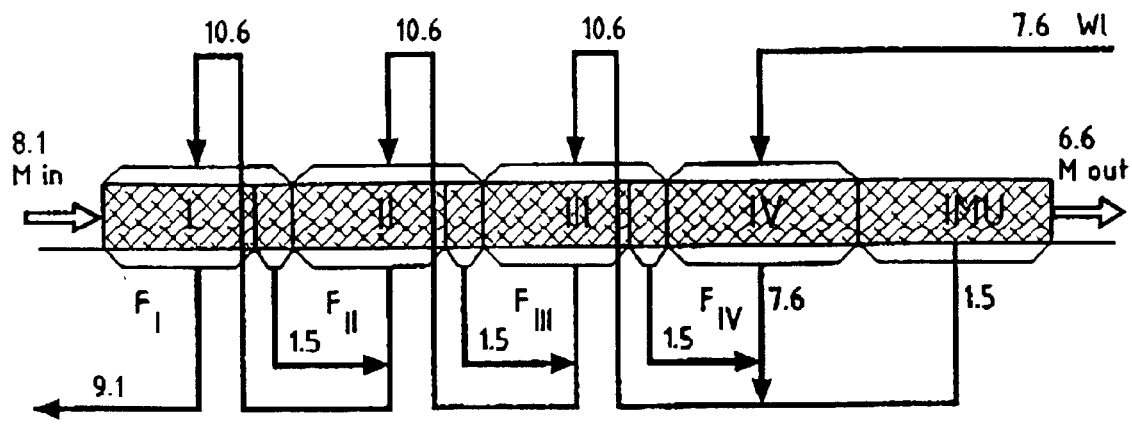
Fig. 5  DF = 1.0
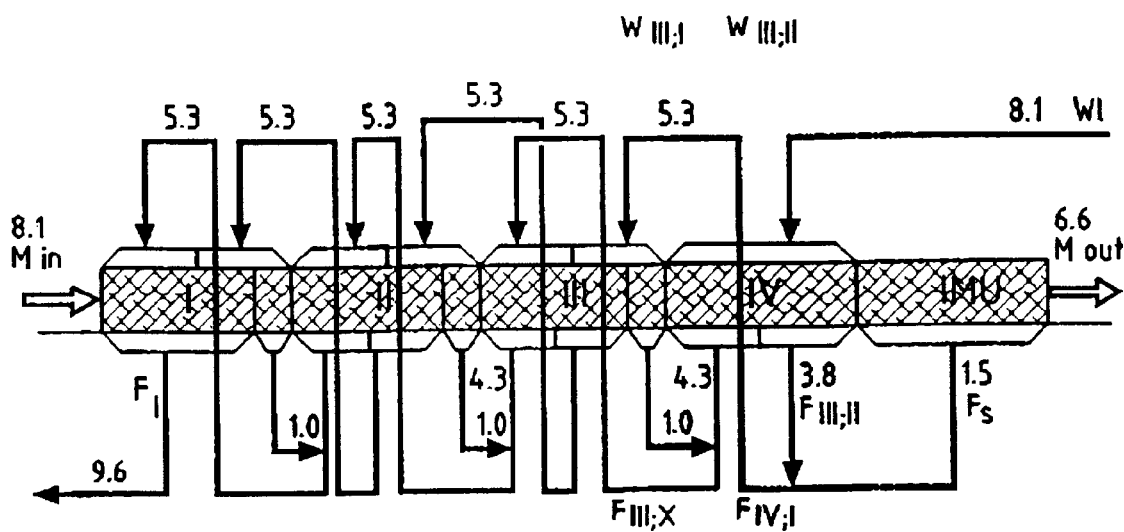
Fig. 6  DF = 1.5

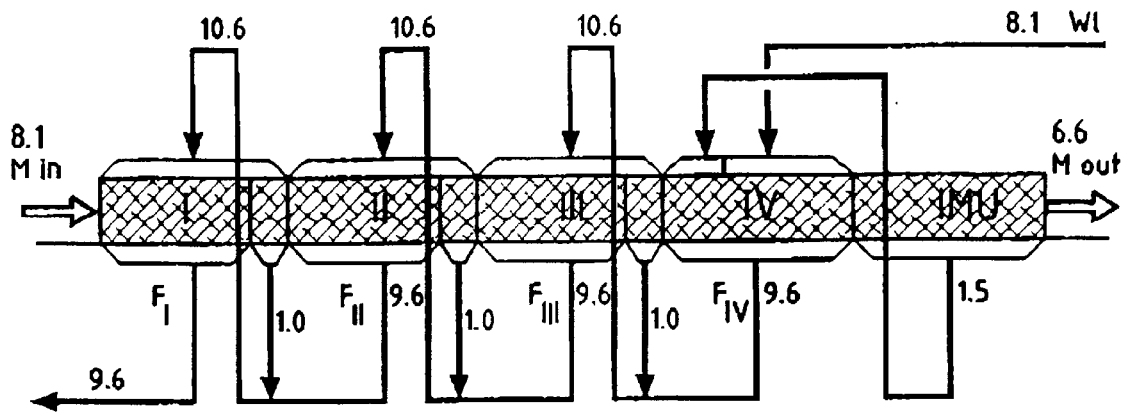
Fig. 7    DF = 1.5
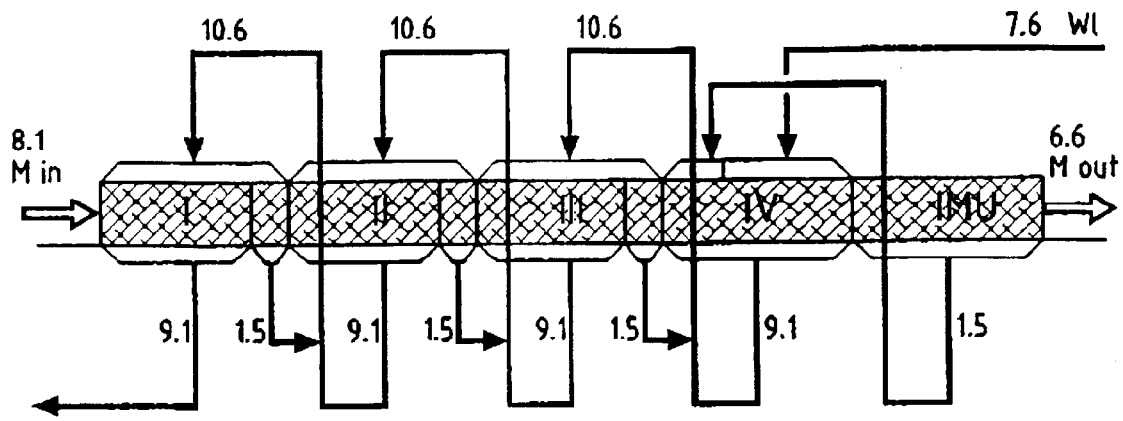
Fig. 8    DF = 1.0

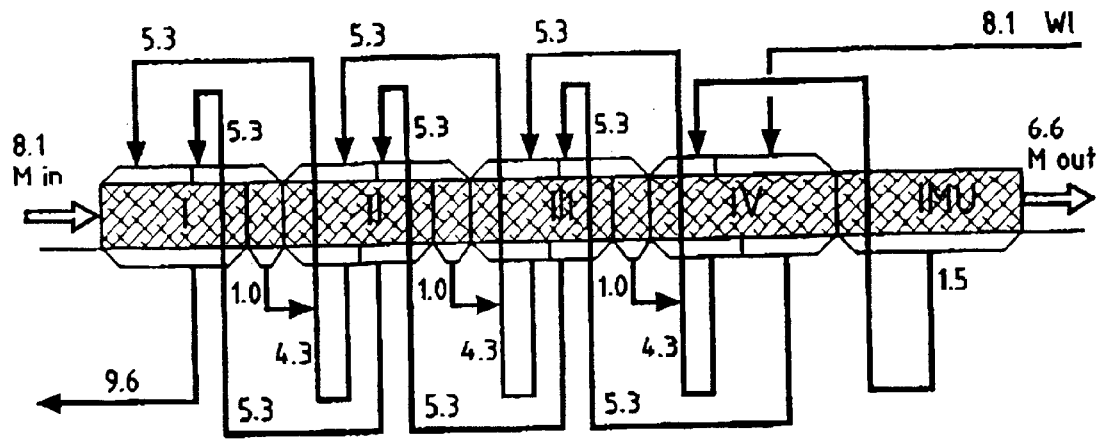
Fig. 9      DF = 1.5
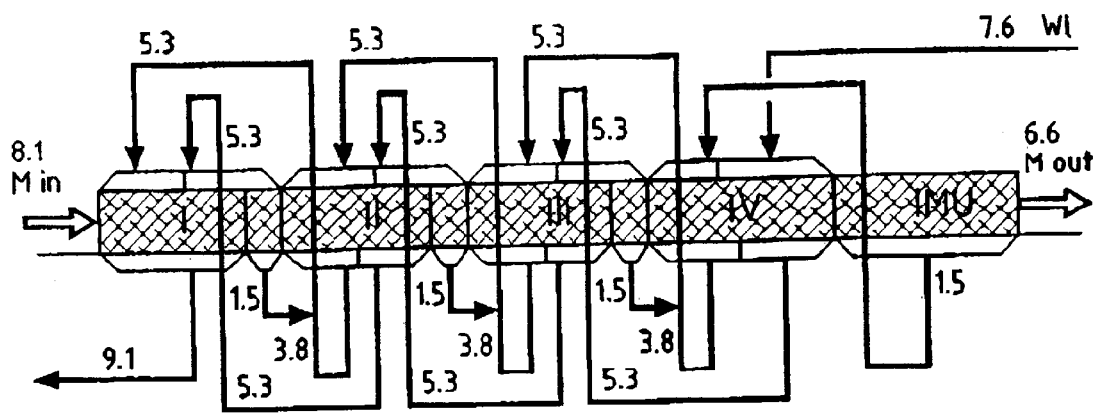
Fig. 10     DF = 1.0

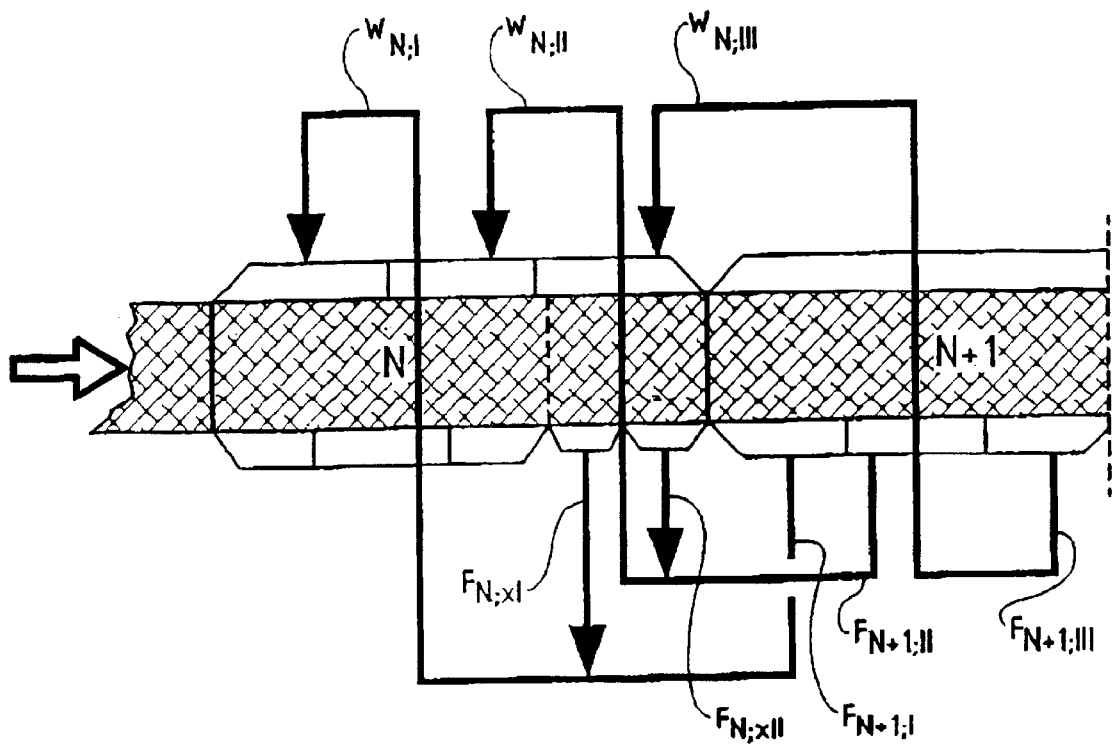
Fig. 11
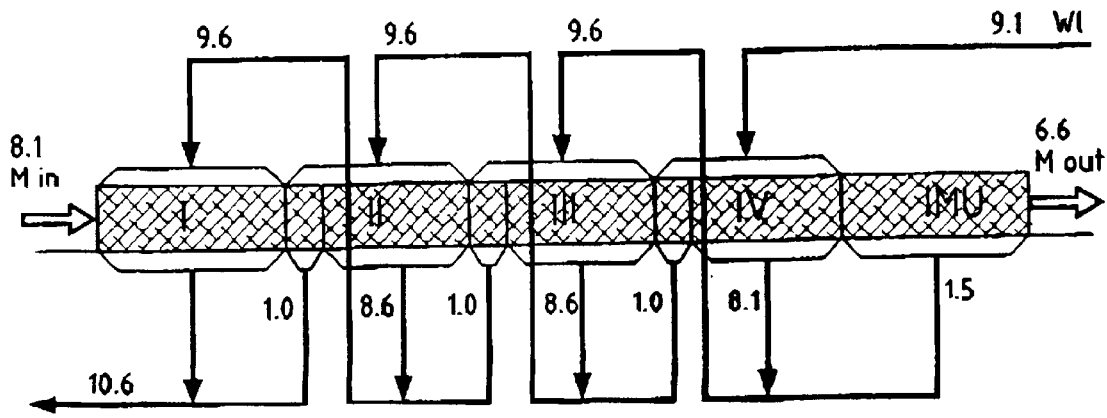
Fig. 12    DF = 2.5

METHOD OF TREATING PULP

CROSS-REFERENCE TO RELATED APPLICATION

This utility application is based upon U.S. provisional application Ser. No. 60/037,257 filed Jan. 31, 1997.

BACKGROUND AND SUMMARY OF THE INVENTION

The present invention relates to a method of intensifying washing of cellulose pulp in various washing apparatus. The method according to the invention is particularly applicable for use with a DRUM DISPLACER® washer sold by A. AHLSTROM CORPORATION of Helsinki, Finland, but also in connection with conventional washing presses. The method is also applicable for use with other washing apparatus, and various suitable washers used for the washing of pulp are described herein.

Several different types of washing apparatus and methods are known from the prior art. Arrangements that can be clearly distinguished from each other include diffusers, drum washers and Fourdrinier wire washers. The pulp is fed into diffuser washers at a consistency of about 10%. The feeding consistency of drum and Fourdrinier wire washers is 1–3%. Drum washers in use at present include a suction washer, a wash press, and a pressurized or superatmospheric washer.

A traditional suction washer comprises a drum covered with a wire, which drum rotates in a basin. On the shell of the drum below a perforated plate are collecting compartments, each of which is connected by a tube of its own to a valve system on the shaft at the end of the drum. From the valve the filtrate is led, for example, into a filtrate tank through a barometric leg or a centrifugal pump generating the suction required. The valve arrangement ensures that the suction effect of the barometric leg can be directed to desired points of the web formation section.

Web formation in a suction washer takes place in such a way that inside the drum rotating in the basin, reduced pressure is generated by the barometric leg or another apparatus generating suction, which under pressure sucks pulp suspension against the drum. As the liquid permeates the drum, the fibers of the cellulose pulp precipitate upon the surface of the drum. The consistency of the fiber suspension in the basin is about 0.5–2%, whereas the consistency of the layer precipitated on the drum is about 10–12%. The web formation area, i.e. that part of the rim of the drum which is covered by the fiber suspension in the basin, is about 140 degrees. The maximum rotational speed of such a drum is 2–2.5 revolutions per minute, since at higher speeds the collecting compartments of the filtrate and the tubes will not have enough time to empty.

Washing takes place as a displacement wash in such a way that wash liquid is injected onto the surface of the drum protruding from the pulp basin, which wash liquid soaks through the pulp layer and displaces the majority of the liquid originally present in the pulp. The extent of the displacement area is about 120 degrees. A typical specific square load is about 5–7 $BDMT/m^2/d$, so that the thickness of the pulp web is on the order of 25 mm. The square load of the suction washer when used in bleaching is about 8 $BDMT/m^2/d$, and the thickness of the web is about 30 mm.

A wash press comprises a drum covered with a wire or having a drilled perforated plate shell. The feed of the pulp takes place at a consistency of 3–4%, and the knots and the like have to be removed from the pulp before the washer. On the shell of the drum are compartments from which the filtrate is fed through a chamber on the end rim. The drum may alternatively or additionally be open, so that the filtrate is collected inside the drum and discharged from an end opening. The length of web formation is about 90 degrees around the drum circumference and that of displacement is about 150 degrees. The speed revolution of the drum is about 2 revolutions/minute, the specific square load being about 15–20 $BDMT/m^2/d$. The consistency of the washed pulp may rise up to about 35%. Displacement takes place with the pulp is at a consistency of 10–15%, with the pulp web about 30–50 mm thick.

One example of a superatmospheric washer is that according to FI patent publications 71961 or 74752. This washer comprises a rotating drum and a solid shell encircling it. The drum comprises or consists of a stationary shell housing on its outer surface ribs attached at intervals of about 200 mm. Between the ribs are perforated plates fixed in such a way that the ribs extend outwardly from the perforated plate about 40–60 mm. The ribs, together with the perforated plates, define pulp compartments. Inside the perforated plates and below the pulp compartments, i.e. in the volume defined by the plates, ribs and solid shell, filtrate compartments are formed into which the filtrate displaced by the wash liquid is gathered. At the end of the cylinder drum, substantially on the diameter of the rim of the drum, is a valve system, through which the filtrate is removed and redirected. There are several stages, usually 2–5, provided in the washer. This means that the wash liquid is used several times to wash the pulp. In other words, filtrates gathered in the filtrate compartments are fed upstream from one washing stage to another. Outside the drum of the washer, constituting a part of the shell of the washer, are feed chambers for the wash liquid, from which the wash liquid is pressed through flow controllers into the pulp in the pulp compartments so as to displace liquid from the pulp to effect washing.

Web formation and washing of the pulp are carried out in such a way that the pulp to be washed is fed through a special feed box into the pulp compartments. The feed box may be constructed so that it dewaters the pulp, so that axial "bars" of the same length as the drum are formed in the pulp compartments. Immediately after the feed point there is a first washing zone. Altogether there are four or five separate stages in the washers of the aforementioned patent publications. A wash liquid flow is fed to each stage and it displaces the liquid present in the pulp layer in the compartments of the wash drum. It was already mentioned above that the filtrates are led upstream from one stage to another. In other words, (cf. FI patent 74752, FIG. 1), a clean wash liquid is pumped to the last washing stage and the filtrate displaced by this liquid is led to the second last washing stage to serve as wash liquid. After the last washing stage, the "pulp bars" are detached from the drum, for example by blowing with pressurized air, and transported away via a transport screw.

A specific square load of this kind of superatmospheric washer with four stages may rise up to about 30 $BDMT/m^2/d$. If the feed consistency rises, then the specific square load may even rise above 30 $BDMT/m^2/d$. The thickness of the "pulp bar" is about 50 mm and the consistency may even rise to 15–18%. The consistency of the pulp fed onto the drum may vary between 3.0–10%. The angular speed of the drum varies between 0.5–3.0 rpm.

U.S. Pat. Nos. 4,919,158 and 5,116,423 disclose an arrangement which is somewhat more advanced than the basic approach of FI patent 71961, and which can achieve a remarkably improved wash compared to the basic arrangement of the above-mentioned publications. In the arrangement of FI patent 74752, each washing stage is divided into two zones in such a way that two wash filtrates with different concentrations are obtained from each stage. Filtrates so obtained are fed upstream in the manner disclosed in these patents. Further, the patents describe how a suction filtrate, i.e. the filtrate extracted from the point between the last washing stage and the pulp discharge, is removed with the washing filtrate from the latter washing zone of the last washing stage and fed to the latter washing zone of the second to last washing stage and used as wash liquid.

In all of the above-described apparatus at least the feed of the wash liquid, or the treatment of the filtrates, or both, have drawbacks, which may lead to poor washing. If a washer is not able to provide adequate washing, then a washer with more washing stages, or even a washer of a different type, is required. It may also be necessary to try to solve the problem by increasing the consumption of clean wash liquid so that there will be greater demand for steam in the evaporation plant and the capacity of the waste water treatment equipment, and also partly the environmental load, have to be increased.

The above-mentioned problems have been significantly dealt with in the manner described in FI patent application 954259 and WO patent application PCT/FI96/00316. In other words, in such a way that at least part of the filtrate obtained after the actual suction, press and/or thickening stage is directed to the preceding wash/washing stage to serve as wash liquid. Further, it is possible to solve these problems in such a way that in a multi-stage fractionating wash at least part of the filtrate from the suction, press, and/or thickening stage taking place after the actual wash is directed to the first zone of the preceding wash/washing stage to serve as wash liquid.

Further, in some mills the evaporation plant is not able to treat washing filtrate flows as large as would be produced by the washing methods according to the above-described patents and patent applications, i.e. in order to wash the pulp as clean as desired. In other words, when utilizing these washing methods, the brown stock would have to be washed at a lower dilution factor (i.e. with a smaller amount of wash liquid into the washer) than normally. Conventionally, the dilution factor in brown stock washing has been on the level of 2.0–3.5 m$^3$/ton of chemical cellulose pulp produced (ADT, or "air dried ton"). The dilution factor is calculated as the difference between the amount of fresh wash liquid brought to the washer per ton of chemical pulp to be washed and the amount of liquid discharged from the washer with the washed pulp. The unit of the dilution factor (DF) is m$^3$/ADT.

When it is necessary to lower the dilution factor, for example because of the capacity of the evaporation plant, the result from washing begins to deteriorate if the above-described washing methods are used. Should the end result from washing achieved under these conditions not be adequate, new washing capacity and/or evaporation capacity has to be added so as to sufficiently increase the dilution factor.

The invention seeks to solve the problems described above in a manner that is applicable to many different types of washers, and in such a way that it is possible to further intensify a cellulose pulp wash without having to invest in or construct more washing equipment.

According to the present invention a method of displacement washing cellulose (e.g. chemical, such as kraft, or mechanical, etc.) pulp in a washing system having a plurality of stages with a filtrate from each stage, the stages in sequence being N, N+1, through N+Z where Z is zero or a whole number greater than one, and the stages including filtrates $F_N$, $F_{N+1}$, through $F_{N+Z}$, where Z is a whole number greater than one, is provided. The method comprises the steps of: (a) Feeding cellulose pulp to the washing system stages, in sequence, including the stages N and N+1. (b) Washing the cellulose pulp in the washing system, including stages N and N+1, and discharging the washed pulp from the washing system. (c) Feeding a wash liquid to each stage of the washing system. And (d) removing at least one filtrate from each stage of the washing system, including the filtrates $F_N$ and $F_{N+1}$; and wherein steps (c) and (d) are practiced so that a part $F_{N:x}$ of the filtrate $F_N$ is combined together with all or part of the filtrate $F_{N+1}$ to produce a combined filtrate, and the combined filtrate is fed to washing stage N during the practice of step (c). In the preferred embodiment the part $F_{N:x}$ of the filtrate $F_N$ is taken from the end of the washing stage N.

Further, stage N+1 typically includes at least two filtrates, $F_{N:x+1,I}$ and $F_{N:x+1,II}$, and wherein the part $F_{N:x}$ of the filtrate $F_N$ from washing stage N is typically combined with the first filtrate $F_{N+1:I}$ from the next washing stage N+1 and is returned to stage N in the practice of step (c). Steps (c) and (d) are practiced for each of a plurality of washing stages. Also step (c) may be practiced using at least first and second wash liquids for stage N; and at least two different filtrates $F_{N:x+1,I}$ and $F_{N:x+1,II}$ may be taken from the end of stage $F_{N+1}$; and at least two different filtrates $F_{N:xI}$ and $F_{N:xII}$ may be taken from the end of washing stage N and are combined with the first two filtrates $F_{N+1:I}$ and $F_{N+1:II}$ from the next washing stage N+1 to form a second combined filtrate; and the second combined filtrate may be returned to stage N to serve as the first and second wash liquids in the practice of step (c). In the preferred embodiment the part $F_{N:x}$ of the filtrate $F_N$ is between about 5–30% of the amount of the filtrate $F_N$.

The invention may also be practiced so that at least two different filtrate parts $F_{N:xI}$, $F_{N:xII}$, are taken from the end of washing stage N, and are combined with at least two different filtrates $F_{N+1:I}$, $F_{N+1:II}$, from the beginning of the next washing stage N+1 to form a second combined filtrate, and the second combined filtrate is fed to washing stage N during the practice of step (c). Each of the parts $F_{N:xI}$, $F_{N:xII}$, is between about 5–30% of the volume of the filtrate $F_N$, and typically the two different filtrates $F_{N+1:I}$, $F_{N+1:II}$, are collectively over 50% of the volume of $F_{N+1}$.

It is the primary object of the present invention to provide an effective method of displacement washing which is versatile, can be used with a variety of different types of washing equipment, and is extremely effective. This and other objects of the invention will become clear from an inspection of the detailed description of the invention and from the appended claims.

BRIEF DESCRIPTION OF THE DRAWINGS

FIGS. 1–3 schematically illustrate an operating principle according to a prior art multi-stage washer at various dilution factors;

FIGS. 4–5 schematically illustrate an arrangement according to a preferred embodiment of the present invention at various dilution factors;

FIG. 6 schematically illustrates an arrangement according to a second preferred embodiment of the present invention;

FIGS. 7 and 8 schematically illustrate an arrangement according to a third preferred embodiment of the present invention at various dilution factors;

FIGS. 9 and 10 schematically illustrate an arrangement according to a fourth preferred embodiment of the present invention at various dilution factors;

FIG. 11 schematically illustrates yet an arrangement according to a fifth preferred embodiment of the present invention; and FIG. 12 schematically illustrates yet another method of using a multi-stage washer according to the present invention.

DETAILED DESCRIPTION OF THE DRAWINGS

The operating principle schematically illustrated in FIGS. 1–3 has been, at least partly, utilized in commercial DRUM DISPLACER® washers (according to FI patent 71961) by AHLSTROM MACHINERY CORPORATION of Karhula, Finland. FIG. 1 illustrates how the pulp $M_{in}$ is fed onto the perforated and moving wire surface 10 of the washer. The wire 10 may be cylindrical, a wash drum, a plane-like belt washer, or the like. The wire 10 is preferably provided with baffles 12. Opposite the wire surface 10 there are stationary wash liquid feed chambers 14, the bottoms 16 of which, together with the baffles 12 and the wire surface 10, form pulp washing chambers 18. Below the wire surface 10 there are a number of filtrate compartments 20 for collecting the filtrate displaced from the pulp by the wash liquid. FI 71961 also describes in more detail how the filtrate is transported from the filtrate compartments 20 via a valve device provided at the end of the drum to a remote location.

In the apparatus of FIG. 1 there are four washing stages (I–IV). There are also corresponding wash liquid feed chambers $14_I$, $14_{II}$, $14_{III}$, and $14_{IV}$, as well as filtrate compartments $20_I$, $20_{II}$, $20_{III}$, and $20_{IV}$. It is typical of the operation of the apparatus of FIG. 1 that a clean wash liquid $W_I$ is brought to the fourth washing stage IV, in which the pulp is cleanest. The filtrate $F_{IV}$ from the fourth washing stage is brought to the third washing stage III to serve as wash liquid, and so on, until the filtrate $F_I$ from the first washing stage is directed to an evaporation plant, used for dilution in a blow tower, and/or directed to waste water treatment. As can be seen, the apparatus illustrated in FIG. 1 is capable of replacing four conventional one-stage washers. In addition, FIG. 1 illustrates how a suction stage is arranged to follow the actual washing stages I, II, III and IV, the filtrate of the suction stage being returned to the second to last washing stage with the filtrate from the preceding washing stage. Also, the above-mentioned WO patent application PCT/FI96/00316 discloses methods for circulating the filtrate from the suction stage. It is to be understood, however, that in view of the operation of the present invention, the existence of the suction stage is not necessarily required but that the same benefits can be achieved via the invention as by the basic process, irrespective of whether there is a suction stage or not.

A more advanced version of the same washer is described in more detail in U.S. Pat. Nos. 4,919,158 and 5,116,423, for example, the disclosures of which are hereby incorporated by reference herein. There may still be four washing stages I–IV, each washing stage being, however, internally divided into two zones, from which filtrates with different concentrations are obtained. In other words, clean wash liquid $W_1$ is brought to the fourth washing stage IV, which liquid displaces filtrate from the pulp. However, due to the fact that in such a displacement wash as was described above the concentration of the liquid decreases relatively evenly beginning from the feed of the pulp $M_{in}$ up until the discharge of the pulp $M_{out}$, the filtrate compartment of the fourth stage has been divided into two parts, which, as mentioned, produce filtrates with different concentrations. These filtrates are now fed upstream, i.e. to the third washing stage III, in such a way that the cleanest filtrate, i.e. the filtrate from the latter zone of the fourth stage, is fed to the feed chamber of the latter zone of the third stage III to serve as wash liquid. Correspondingly, the fouler filtrate, i.e. the filtrate from the former zone of the fourth stage, is guided to the feed chamber of the former zone of the third stage III to serve as wash liquid. By continuing this procedure throughout the entire wash, pulp is produced which is about 15–30% cleaner than pulp produced by the basic arrangement of the prior art of FIG. 1.

According to the operating principle of a fractionating multi-stage washer of this kind, several filtrates from one or more washing stages are received which are then fed to the previous washing stage to the zone having the same ordinal number, to be used as wash liquid. Thus, although a washer with each stage divided into two zones has been described, nothing prevents the stages from being divided into three zones, for example, so that three different filtrates are obtained, or even into more zones, with a filtrate from each zone. It is also possible to divide the various stages into zones in a different way. In other words, for example only one filtrate may be extracted from a washing stage into which two or more wash liquids with different concentrations have been supplied. The first washing stage of the DRUM DISPLACER® washer is often of this type, so that the filtrate obtained therefrom is extracted as one fraction for utilization in dilution of pulp and/or chemical recovery.

FIGS. 1–3 also illustrate how the filtrate from the first washing stage I is fed for example into an evaporation plant, or to another filtrate treatment stage.

FIGS. 1–3 illustrate a simplified version of the operation of a multi-stage washer. Most often, as a basic rule, the feeding compartments of each of the washing stages I–IV are divided into two parts in such a way that two liquids with different concentrations are both supplied to and taken from each stage. For the sake of simplicity, this is not shown in FIGS. 1–3.

In the embodiment illustrated in FIGS. 1–3, the pulp is supplied to the washer at a consistency of about 10% and removed from the washer, as a result of the suction stage, at a consistency of about 12%. FIG. 1 shows that 9.1 m³ of wash liquid $W_1$ is brought into the washer per ADT, and this liquid is assumed to displace the same amount of washing filtrate from the pulp, thus the consistency of the pulp does not significantly change in the washing stage. 1.5 m³ of suction filtrate is taken from the suction stage following the last washing stage, and hence the discharge consistency of the pulp is raised to 12%. The washing filtrate from the next to last washing stage, 9.1 m³, is taken together with the suction filtrate, 1.5 m³, to the third washing stage to serve as wash liquid, the amount of which is 10.6 m³ per ADT, and the same amount of washing filtrate, 10.6 m³, is displaced. The procedure is carried on further, so that again 10.6 m³ of washing filtrate is obtained from the first washing stage, which filtrate is then taken to an evaporation plant or elsewhere to be used or treated. Since the consistency of the pulp is regarded as remaining uniform all the way through the different washing stages, there is 8.1 m³ of liquid in the pulp discharged from the last washing stage, too, i.e. the same amount as in the pulp entering the washer. As 1.5 m³ of liquid out of the 8.1 m³ is discharged as suction filtrate, there remains 6.6 m³ of liquid in the pulp discharging from the washer. Thus, the dilution factor is 9.1–6.6, i.e. 2.5 m³/ADT.

Using the numerical values of FIG. 2 a dilution factor of 1.5 is achieved. In other words, by supplying one cubic meter less of wash liquid $W_1$, the amount of the liquid to be discharged for an evaporation plant or other use or treatment is also decreased by one cubic meter, but at the same time, also the dilution factor decreases to 1.5. In FIG. 3, the amount of entering wash liquid is further decreased to 7.6 $m^3$, the dilution factor thus being about 1.0.

FIG. 4 illustrates simply and schematically a washing method according to a preferred embodiment of the invention. This is based on the situation illustrated in FIG. 2, in which, for example, an evaporation plant is only capable of treating filtrate below about 10 $m^3$/ADT. As illustrated in FIG. 4, filtrate arrangements within the washer enable the washing efficiency to be raised in such a way that the first three stages correspond to a washer having a dilution factor of 2.5. The basis for this operation is that filtrate, for example 1 $m^3$/ADT, is taken from the first three stages, especially preferably from the final stages thereof, in which the pulp is cleanest, and connected through the filtrate from the following washing stage, to be reused as wash liquid in the stage from which the cleanest filtrate was taken. Viewing the washing method of FIG. 4 as a whole, it can be seen that 8.1 $m^3$/ADT of fresh wash liquid $W_1$ is supplied to the last washing stage IV; the filtrate displaced by this liquid, 8.1 $m^3$, the filtrate from the suction stage, 1.5 $m^3$, and the cleanest filtrate from the second last washing stage III, 1.0 $m^3$—altogether 10.6 $m^3$/ADT—are combined and supplied to the second to last washing stage III to serve as wash liquid. This liquid, in turn, displaces 10.6 $m^3$ of filtrate, of which the cleanest part, 1.0 $m^3$ is combined with the filtrate of the last washing stage IV and the rest, 9.6 $m^3$, is taken with the cleanest filtrate from the preceding washing stage, 1.0 $m^3$, to the preceding washing stage 11 to serve as wash liquid. This method is carried on until the first washing stage 1, a part—1.0 $m^3$—of the filtrate—10.6 $m^3$ altogether—from this stage is then combined with the filtrate from the second washing stage, so that there remains 9.6 $m^3$ of filtrate per ton of chemical pulp to be discharged to the evaporator. Paying attention to the amount of liquid circulating within the washer, it can be observed that the amount of the wash liquid supplied to the first three stages is 10.6 $m^3$, which corresponds to the situation in FIG. 1 with a dilution factor of 2.5.

In other words, apart from the last washing stage, the washer of FIG. 4 operates in the same way as a conventional washer run with a dilution factor of 2.5. The whole operation of the washer and the circulation of the wash liquid back to the same stage to serve as wash liquid, as described above, are totally based upon the fact that the concentration of the filtrate from each washing stage changes remarkably at various points of the stage in question. The filtrate discharged from the beginning of a stage has the strongest concentration of contaminants and the filtrate discharged from the end of a stage is the weakest. In fact, the filtrate discharged from the end of a stage has a concentration which is closer to the concentration of the filtrate from the beginning of the following stage than to the concentration of the filtrate from the beginning of its own stage.

FIG. 5 illustrates a situation corresponding to that in FIG. 4, but in such a way that the dilution factor (DF) in the last stage is seemingly 1.0, although, due to the back-circulation of the first stages (1.5 $m^3$), the operation of the washer and the amount of the wash liquid to be circulated corresponds to a dilution factor of 2.5. This has been achieved by directing 1.5 $m^3$ of the filtrates from the end of the first three washing stages to combine with the filtrate of the next washing stage, and by returning the combined filtrate to the same washing stage to serve as wash liquid. In other words, the amount of the filtrate to be back-circulated is on the order of 15 percent of the amount of the filtrate obtained from the whole stage. The lower limit of the filtrate to be circulated is about 5% because the benefit achieved with a smaller amount would be next to nothing. On the other hand, the upper limit is on the order of 20–30%, because the concentration of the filtrate to be circulated is in any case higher than that of the actual wash liquid and with a larger amount of circulation it would have a negative effect on the washing efficiency of the wash liquid to be supplied. Sometimes it is the capacity of the washer itself that limits the amount of back-circulation.

FIG. 6 illustrates a further washing method according to an especially preferred embodiment of the invention. It is the same kind of method as presented in FIG. 4, except that it illustrates an operational model of a fractionating washer in which two wash liquids with different concentrations are fed to each washing stage and two substantially different filtrates are taken therefrom. In the washing method of FIG. 6, 8.1 $m^3$ of clean wash liquid is brought to the last washing stage (which is in this embodiment is stage IV, even if a two-or three-stage washer could be used as well), and the same amount of filtrate $F_{IV}$ is separated to the filtrate compartments. The filtrate compartments of the washing stage IV are divided in such a way that the amounts of the wash liquids $W_{III;I}$ and $W_{III;II}$ fed to the washing stage III as separate flows are, after various connections, about equal. However, the feed of the wash liquids is also possible with wash liquid flows of different volumes. In this embodiment, though, 3.8 $m^3$ is taken as the latter filtrate $F_{IV;II}$ and 4.3 $m^3$ as the first filtrate $F_{IV;I}$ of the last washing stage, because when the suction filtrate $F_S$, 1.5 $m^3$, is combined with the latter filtrate $F_{IV;II}$ and the filtrate $F_{III;x}$, 1.0 $m^3$, to be back-circulated from the second-to-last washing stage is combined with the first filtrate $F_{IV;I}$, the volume of both wash liquid flows $W_{III;I}$ and $W_{III;II}$ to be supplied to the second to last stage will be 5.3 $m^3$. Since the filtrate $F_{N;x}$ to be back-circulated from each stage N, more precisely from the end of each stage, is combined with the first filtrate $F_{N+1;I}$ of the following stage, it is naturally supplied to be used as the first wash liquid $W_{N;I}$ of each stage.

FIGS. 7 and 8 illustrate embodiments the same as in FIGS. 4 and 5, except that in FIGS. 7 and 8 the suction filtrate has been led to the last washing stage (IV in these embodiments) to serve as wash liquid. In FIGS. 4 and 5 the suction filtrate was led to the second to last washing stage (III in those embodiments) to serve as wash liquid. It is also to be observed that, as FIGS. 7–10 illustrate, the suction filtrate is preferably directed to the beginning of the last washing stage to be used as wash liquid.

The embodiments of FIGS. 9 and 10 correspond to the arrangement of FIG. 6, as far as the two-zone fractionating washer is concerned. In other words, in FIGS. 9 and 10 the suction filtrate is directed to the beginning of the last stage IV to serve as wash liquid and the last filtrates $F_{N;x}$ from the first three stages I, II and III, respectively, are directed to be returned to the beginning of the same stage to serve as wash liquid, in other words as the first wash liquid $W_{N;I}$, as already illustrated in FIG. 6.

At this point, it is worth observing that it is also possible to separate filtrate, from the end of the last (IV) stage, to combine it with the suction filtrate and to return it to the beginning of the last washing stage to be used as wash liquid. In other words, although in the embodiments of FIGS. 4–10 the filtrate from the end of the last stage has not been presented as being combined with the suction filtrate, this may be done.

FIG. 11 schematically illustrates that it is possible to divide each of the washing stages into more than one zone (in FIG. 11 the washing stage is divided into three zones), so that it is also possible to take several filtrate fractions from the end of each washing stage and to return them as wash liquid to the same stage in the same order, combined with the filtrates from the next washing stage. For example, if each washing stage is divided into three parts—so that three main filtrates with different concentrations are taken from each washing stage and also three wash liquids are supplied to each stage—it is possible to take two different filtrates $F_{N;xI}$ and $F_{N;xII}$ from the end of washing stage N and to combine these with the first two filtrates $F_{N+1;I}$ and $F_{N+1;II}$ of the next washing stage N+1 to form two wash liquids $W_{N;I}$ and $W_{N;II}$, which wash liquids are supplied to stage N as the first two wash liquids. It is possible to do substantially the same thing when the stages are divided into more than three zones. Naturally, the stages can also be divided into more than two zones according to the method of the invention and still take only one single filtrate $F_{N;x}$ from the end of stage N and to combine it with the first filtrate $F_{N+1;I}$ from the next stage N+1, as illustrated by the basic version of the invention in FIG. 5.

Finally, it is worth observing that although it is described above how a filtrate from the end of a stage is returned to the beginning of the same stage to serve as wash liquid, in some cases it may be possible or necessary to take part of a filtrate from the beginning of a stage and to feed it together with the filtrate from the preceding stage (or part of it) past the preceding stage to serve as wash liquid in the stage preceding that stage. For example, filtrate may be taken from the beginning of the fourth washing stage, and this filtrate may then be combined with the majority of the filtrate from the third stage and returned to the second stage to be used as wash liquid. Such circulation of wash liquids is by no means due to an effort to achieve maximum washing efficiency but to a situation where there is too little washing area relative to the amount of the wash liquid that should pass through the pulp. Directing part of the wash liquid more rapidly through the washer (in the above-mentioned example part of the filtrate is fed directly from the fourth stage to the second stage) decreases the internal dilution factor and makes the washing area sufficient.

FIG. 12 illustrates a situation where the external dilution factor of the washer is 2.5, in other words 6.6 m$^3$ of liquid discharged per ADT, and 9.1 m$^3$ of fresh wash liquid per ADT is fed to the fourth stage. FIG. 12 shows, firstly, how the filtrate, 1.5 m$^3$, from the suction/pressing stage is connected with the majority, 8.1 m$^3$, of the filtrate from the fourth washing stage IV and how the combined filtrate, 9.6 m$^3$, is fed to the third stage III to serve as wash liquid. Further, FIG. 12 shows how 1.0 m$^3$ of filtrate is taken from the beginning of the fourth washing stage and combined with the majority, 8.6 m$^3$, of the filtrate from the third washing stage and how the combined filtrate, 9.6 m$^3$, is fed to the second washing stage II to serve as wash liquid. The procedure is carried on in the same way, until part of the filtrate, 1.0 m$^3$, from the second washing stage II is fed together with the filtrate from the whole washing stage I, 9.6 m$^3$, out of the washer. A corresponding procedure can also easily be applied to fractionating washers, so that at least two filtrates with different concentrations are supplied to at least one stage and filtrates with different concentrations are taken from at least one stage.

As can be seen from the above description, by practicing the invention it is possible to develop washing processes (in the wood processing industry) so that they become more economical and more environmentally friendly. It should be understood, however, that all embodiments described above, except the illustration of FIG. 12, represent only a few preferred embodiments of the invention, and they are not intended to restrict the scope of the invention from what is presented in the appended claims. Thus, it is clear that although the above figures illustrate a four-stage washer alone, it is possible that there are 1–n washing stages, whereby n is a positive integer and is only limited by the production techniques available and/or the requirements set for washing efficiency. Thus, it is quite possible that n may be above four, e.g. presently 5–7, but in the future even these values may be exceeded.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of displacement washing cellulose pulp in a washing system having a plurality of stages with a filtrate from each stage, the stages in sequence being N, N+1, through N+Z where Z is a whole number greater than one, and the stages including filtrates $F_N$, $F_{N+1}$, through $F_{N+Z}$, where Z is or a whole number greater than one; said method comprising the steps of:

(a) feeding cellulose pulp to the washing system stages, in sequence, including the stages N and N+1;

(b) washing the cellulose pulp in the washing system, including stages N and N+1, and discharging the washed pulp from the washing system;

(c) feeding a wash liquid to each stage of the washing system; and (d) removing at least one filtrate from each stage of the washing system, including the filtrates $F_N$ and $F_{N+1}$; and wherein steps (c) and (d) are practiced so that a part $F_{N;x}$ of the filtrate $F_N$ is combined together with only all or part of the filtrate $F_{N+1}$ to produce a combined filtrate, and the combined filtrate is fed to washing stage N during the practice of step (c).

2. A method of displacement washing cellulose pulp in a washing system having a plurality of stages with a filtrate from each stage, the stages in sequence being N, N+1, through N+Z where Z is a whole number greater than one, and the stages including filtrates $F_N$, $F_{N+1}$, through $F_{N+Z}$, where Z is a whole number greater than one; said method comprising the steps of:

(a) feeding cellulose pulp to the washing system stages, in sequence, including the stages N and N+1;

(b) washing the cellulose pulp in the washing system, including stages N and N+1, and discharging the washed pulp from the washing system;

(c) feeding a wash liquid to each stage of the washing system; and (d) removing at least one filtrate from each stage of the washing system, including the filtrates $F_N$ and $F_{N+1}$;

wherein steps (c) and (d) are practiced so that a part $F_{N;x}$ of the filtrate $F_N$ is combined together with all or part of the filtrate $F_{N+1}$ to produce a combined filtrate, and the combined filtrate is fed to washing stage N during the practice of step (c); and wherein the part $F_{N;x}$ of the filtrate $F_N$ is taken from the end of the washing stage N.

3. A method as recited in claim 2 wherein the stage N+1 includes at least two filtrates, $F_{N;x+1I}$ and $F_{N;x+1II}$, and wherein the part $F_{N;x}$ of the filtrate $F_N$ from washing stage N is combined with the first filtrate $F_{N+1;I}$ from the next washing stage N+1 and is returned to stage N in the practice of step (c).

4. A method as recited in claim 1 wherein steps (c) and (d) are practiced for each of a plurality of washing stages.

5. A method of displacement washing cellulose pulp in a washing system having a plurality of stages with a filtrate from each stage, the stages in sequence being N, N+1, through N+Z where Z is a whole number greater than one, and the stages including filtrates $F_N$, $F_{N+1}$, through $F_{N+Z}$, where Z is a whole number greater than one; said method comprising the steps of:

(a) feeding cellulose pulp to the washing system stages, in sequence, including the stages N and N+1;

(b) washing the cellulose pulp in the washing system, including stages N and N+1, and discharging the washed pulp from the washing system;

(c) feeding a wash liquid to each stage of the washing system; and (d) removing at least one filtrate from each stage of the washing system, including the filtrates $F_N$ and $F_{N+1}$;

wherein steps (c) and (d) are practiced so that a part $F_{N;x}$ of the filtrate $F_N$ is combined together with all or part of the filtrate $F_{N+1}$ to produce a combined filtrate, and the combined filtrate is fed to washing stage N during the practice of step (c) wherein step (c) is practiced using at least first and second wash liquids for stage N; and wherein at least two different filtrates $F_{N;x+1,I}$ and $F_{N;x+1,II}$ are taken from the end of stage $F_{N+1}$; and wherein at least two different filtrates $F_{N;xI}$ and $F_{N;xII}$ are taken from the end of washing stage N and are combined with the first two filtrates $F_{N+1};I$ and $F_{N+1};II$ from the next washing stage N+1 to form a second combined filtrate; and wherein the second combined filtrate is returned to stage N to serve as the first and second wash liquids in the practice of step (c).

6. A method of displacement washing cellulose pulp in a washing system having a plurality of stages with a filtrate from each stage, the stages in sequence being N, N+1, through N+Z where Z is a whole number greater than one, and the stages including filtrates $F_N$, $F_{N+1}$, through $F_{N+Z}$, where Z is a whole number greater than one; said method comprising the steps of:

(a) feeding cellulose pulp to the washing system stages, in sequence, including the stages N and N+1;

(b) washing the cellulose pulp in the washing system, including stages N and N+1, and discharging the washed pulp from the washing system;

(c) feeding a wash liquid to each stage of the washing system; and (d) removing at least one filtrate from each stage of the washing system, including the filtrates $F_N$ and $F_{N+1}$;

wherein steps (c) and (d) are practiced so that a part $F_{N;x}$ of the filtrate $F_N$ is combined together with all or part of the filtrate $F_{N+1}$ to produce a combined filtrate, and the combined filtrate is fed to washing stage N during the practice of step (c); and wherein the part $F_{N;x}$ of the filtrate $F_N$ is between about 5–30% of the amount of the filtrate $F_N$.

7. A method of displacement washing cellulose pulp in a washing system having a plurality of stages with a filtrate from each stage, the stages in sequence being N, N+1, through N+Z where Z is a whole number greater than one, and the stages including filtrates $F_N$, $F_{N+1}$, through $F_{N+Z}$, where Z is a whole number greater than one; said method comprising the steps of:

(a) feeding cellulose pulp to the washing system stages, in sequence, including the stages N and N+1;

(b) washing the cellulose pulp in the washing system, including stages N and N+1, and discharging the washed pulp from the washing system;

(c) feeding a wash liquid to each stage of the washing system; and (d) removing at least one filtrate from each stage of the washing system, including the filtrates $F_N$ and $F_{N+1}$;

wherein steps (c) and (d) are practiced so that a part $F_{N;x}$ of the filtrate $F_N$ is combined together with all or part of the filtrate $F_{N+1}$ to produce a combined filtrate, and the combined filtrate is fed to washing stage N during the practice of step (c); and wherein at least two different filtrate parts $F_{N;xI}$, $F_{N;xII}$, are taken from the end of washing stage N, and are combined with at least two different filtrates $F_{N+1};I$, $F_{N+1};II$, from the beginning of the next washing stage N+1 to form a second combined filtrate, and the second combined filtrate is fed to washing stage N during the practice of step (c).

8. A method as recited in claim 7 wherein each of the parts $F_{N;xI}$, $F_{N;xII}$, is between about 5–30% of the amount of the filtrate $F_N$.

9. A method as recited in claim 1 wherein steps (a)–(d) are practiced to wash chemical pulp.

10. A method as recited in claim 1 wherein the part FN;x of the filtrate FN is taken from the end of the washing stage N.

11. A method as recited in claim 10 wherein the stage N+1 includes at least two filtrates, FN;x+1I and FN;x+1II, and wherein the part FN;x of the filtrate FN from washing stage N is combined with the first filtrate FN+1;I from the next washing stage N+1 and is returned to stage N in the practice of step (c).

12. A method as recited in claim 1 wherein step (c) is practiced using at least first and second wash liquids for stage N; and wherein at least two different filtrates FN;x+1,I and FN;x+1,II are taken from the end of stage FN+1; and wherein at least two different filtrates FN;xI and FN;xII are taken from the end of washing stage N and are combined with the first two filtrates FN+1;I and FN+1;II from the next washing stage N+1 to form a second combined filtrate; and wherein the second combined filtrate is returned to stage N to serve as the first and second wash liquids in the practice of step (c).

13. A method as recited in claim 1 wherein the part FN;x of the filtrate FN is between about 5–30% of the amount of the filtrate FN.

14. A method as recited in claim 1 wherein at least two different filtrate parts FN;xI, FN;xII, are taken from the end of washing stage N, and are combined with at least two different filtrates FN+1;I, FN+1;II, from the beginning of the next washing stage N+1 to form a second combined filtrate, and the second combined filtrate is fed to washing stage N during the practice of step (c).

15. A method as recited in claim 14 wherein each of the parts $FN;xI$, $FN;xII$, is between about 5–30% of the amount of the filtrate FN.

16. A method as recited in claim 6 wherein the part $FN;x$ of the filtrate FN is taken from the end of the washing stage N.

17. A method as recited in claim 16 wherein the stage N+1 includes at least two filtrates, $FN;x+1I$ and $FN;x+1II$, and wherein the part $FN;x$ of the filtrate FN from washing stage N is combined with the first filtrate $FN+1;I$ from the next washing stage N+1 and is returned to stage N in the practice of step (c).

18. A method as recited in claim 5 wherein the part $FN;x$ of the filtrate FN is taken from the end of the washing stage N.

19. A method as recited in claim 18 wherein the stage N+1 includes at least two filtrates, $FN;x+1I$ and $FN;x+1II$, and wherein the part $FN;x$ of the filtrate FN from washing stage N is combined with the first filtrate $FN+1;I$ from the next washing stage N+1 and is returned to stage N in the practice of step (c).

20. A method as recited in claim 5 wherein the part $FN;x$ of the filtrate FN is between about 5–30% of the amount of the filtrate FN.

* * * * *